United States Patent
Davis et al.

(10) Patent No.: US 9,671,846 B1
(45) Date of Patent: Jun. 6, 2017

(54) POWER SEQUENCING FOR OPTIMAL SYSTEM LOAD AT START UP

(71) Applicant: Pure Storage, Inc., Mountain View, CA (US)

(72) Inventors: John D. Davis, Mountain View, CA (US); Alex Ho, Mountain View, CA (US); Clay Ross, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 116 days.

(21) Appl. No.: 14/645,398

(22) Filed: Mar. 11, 2015

(51) Int. Cl.
*G06F 1/00* (2006.01)
*G06F 1/26* (2006.01)

(52) U.S. Cl.
CPC ..................... *G06F 1/26* (2013.01)

(58) Field of Classification Search
CPC ....................................................... G06F 1/26
USPC .................. 713/330; 710/302, 304
See application file for complete search history.

(56) References Cited

U.S. PATENT DOCUMENTS

| | | | | |
|---|---|---|---|---|
| 7,370,220 B1* | 5/2008 | Nguyen | ................... | G06F 1/26 713/300 |
| 7,444,532 B2* | 10/2008 | Masuyama | ............... | G06F 1/26 713/300 |
| 2003/0105984 A1* | 6/2003 | Masuyama | ............... | G06F 1/26 713/330 |
| 2010/0174576 A1* | 7/2010 | Naylor | ................... | G06Q 10/04 701/31.4 |
| 2012/0198261 A1* | 8/2012 | Brown | ....................... | G06F 1/26 713/330 |
| 2015/0153800 A1* | 6/2015 | Lucas | ..................... | G06F 1/305 713/300 |

* cited by examiner

*Primary Examiner* — Mark Connolly
(74) *Attorney, Agent, or Firm* — Womble Carlyle Sandridge & Rice LLP

(57) ABSTRACT

A method for power sequencing is provided. The method includes determining a chassis configuration prior to blades within slots of the chassis being powered up and generating a power sequence based on the determining. The method includes applying the power sequence to the blades and monitoring the applying and the chassis configuration to achieve an optimal system load.

20 Claims, 7 Drawing Sheets

POWER SEQUENCING FOR OPTIMAL SYSTEM LOAD AT START UP

BACKGROUND

Solid-state memory, such as flash, is currently in use in solid-state drives (SSD) to augment or replace conventional hard disk drives (HDD), writable CD (compact disk) or writable DVD (digital versatile disk) drives, collectively known as spinning media, and tape drives, for storage of large amounts of data. Flash and other solid-state memories have characteristics that differ from spinning media. Yet, many solid-state drives are designed to conform to hard disk drive standards for compatibility reasons, which makes it difficult to provide enhanced features or take advantage of unique aspects of flash and other solid-state memory. Powering up a storage system or hybrid system with large amounts of solid-state memory and/or processors may cause power surges. This could damage power supplies or circuitry or memory in the storage system.

It is within this context that the embodiments arise.

SUMMARY

In some embodiments, a method for power sequencing is provided. The method includes determining a chassis configuration prior to blades within slots of the chassis being powered up and generating a power sequence based on the determining. The method includes applying the power sequence to the blades and monitoring the applying and the chassis configuration to achieve an optimal system load.

In some embodiments, a power sequencing system is provided. The power sequencing system includes a chassis having a plurality of slots that accept blades and a plurality of blades, each blade of the plurality of blades having blade attributes that circuitry within the chassis is configured to identify prior to applying power to the plurality of blades. The circuitry within the chassis is configured to apply a power sequencing method to the plurality of blades. The method includes generating a power sequence based on the identified blade attributes and a chassis configuration and applying the power sequence to the plurality of blades. The method includes monitoring the applying and the chassis configuration to achieve an optimal system load.

In some embodiments, a power sequencing chassis is provided. The chassis has a plurality of slots and a plurality of blades disposed within the plurality of slots. Circuitry of the chassis is configured execute a power sequence method for powering each blade of the plurality of blades. The method includes determining a chassis configuration prior to the plurality of blades within the plurality of slots of the chassis being powered up and generating a power sequence based on the determining. The method includes applying the power sequence to the plurality of blades and monitoring the applying and the chassis configuration to achieve an optimal system load.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
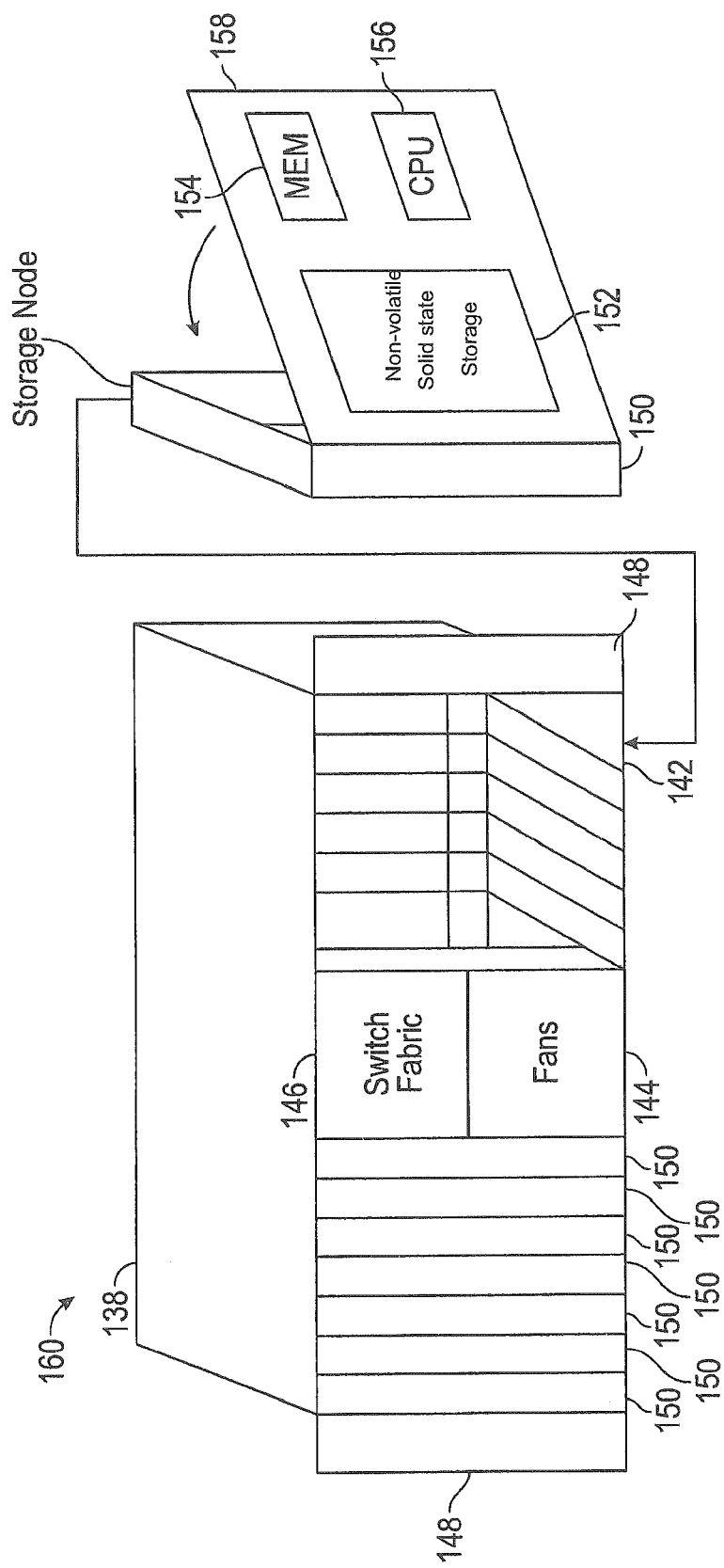
FIG. 1 is a perspective view of a storage cluster with multiple storage nodes and internal storage coupled to each storage node to provide network attached storage, in accordance with some embodiments.

A power sequencing system is herein disclosed as applied to blades, a chassis, and in some embodiments a rack, of a storage cluster or hybrid system. The storage cluster is described below with reference to FIGS. 1-3, while the power sequencing system is described below with reference to FIGS. 4-8. In the power sequencing system, the chassis detects presence of blades, the number of blades in the chassis or rack, and the types of blades and sequences the application of power to the blades. Each blade has a blade identifier or blade attribute, which the chassis uses to detect the presence of the blade and its type in some embodiments. In some embodiments, the chassis forms a slot occupancy vector, based on the blade identifier of each blade occupying a slot of the chassis. Power sequencing is based on the blade identifiers, blade attributes, types and numbers of the blades in the system. In some embodiments, the sequencing is adaptive. Thus, the sequence can change based on what is in the chassis. In various embodiments, a power supply sequencer employs a timer circuit, a randomizer, a linear feedback shift register, a processor executing software, a state machine, or other circuitry. In some embodiments the system achieves an optimal system load and monitors power sequencing to tune subsequent power sequencing cycles.

The embodiments below describe a storage cluster and/or hybrid system that stores user data, such as user data originating from one or more user or client systems or other sources external to the storage cluster. The storage cluster distributes user data across storage nodes housed within a chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster is contained within one or more chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides 1 or more ports for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node.

Each storage node may be one or more storage servers and each storage server is connected to one or more non-volatile solid state memory units, which may be referred to as storage units. One embodiment includes a single storage server in each storage node and between zero to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

FIG. 1 is a perspective view of a storage cluster 160, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 160, each having one or more storage nodes 150, in a flexible and reconfigurable arrangement of both the physical components and the amount of storage memory provided thereby. The storage cluster 160 is designed to fit in a rack, and one or more racks can be set up and populated as desired for the storage memory. The storage cluster 160 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In some embodiments the switch fabric may contain chassis management resources, which may be referred to as a chassis management system, that contains the logic for providing the power sequencing functionality described herein. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change.

Reconfiguration, in some embodiments, includes restoring redundancy and/or rebalancing data or load.

Each storage node 150 can have multiple components. In the embodiment shown here, the storage node 150 includes a printed circuit board 158 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 1, storage cluster 160 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2:
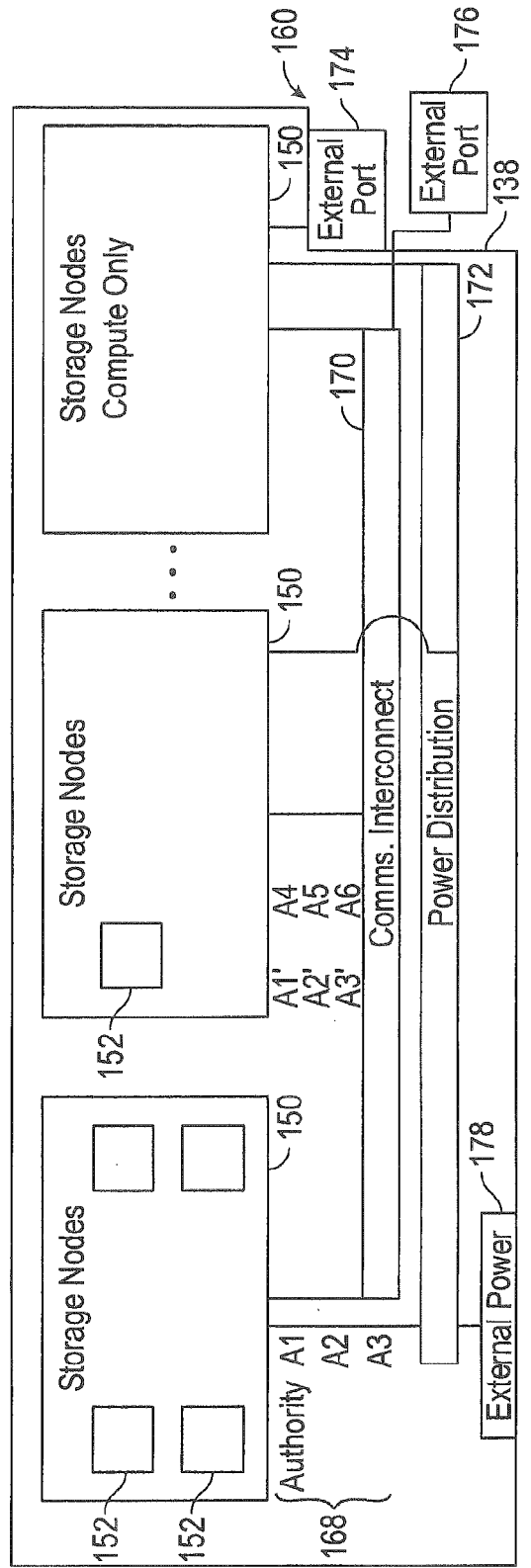
FIG. 2 is a block diagram showing an interconnect switch coupling multiple storage nodes in accordance with some embodiments.

FIG. 2 is a block diagram showing a communications interconnect 170 and power distribution bus 172 coupling multiple storage nodes 150. Referring back to FIG. 1, the communications interconnect 170 can be included in or implemented with the switch fabric 146 in some embodiments. Where multiple storage clusters 160 occupy a rack, the communications interconnect 170 can be included in or implemented with a top of rack switch, in some embodiments. As illustrated in FIG. 2, storage cluster 160 is enclosed within a single chassis 138. External port 176 is coupled to storage nodes 150 through communications interconnect 170, while external port 174 is coupled directly to a storage node. External power port 178 is coupled to power distribution bus 172. Storage nodes 150 may include varying amounts and differing capacities of non-volatile solid state storage 152 as described with reference to FIG. 1. In addition, one or more storage nodes 150 may be a compute only storage node as illustrated in FIG. 2. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of Mode numbers, segment numbers, or other data identifiers which are assigned to data by a file system, by the storage nodes 150, or by the non-volatile solid state storage 152, in various embodiments.

Figure 3:
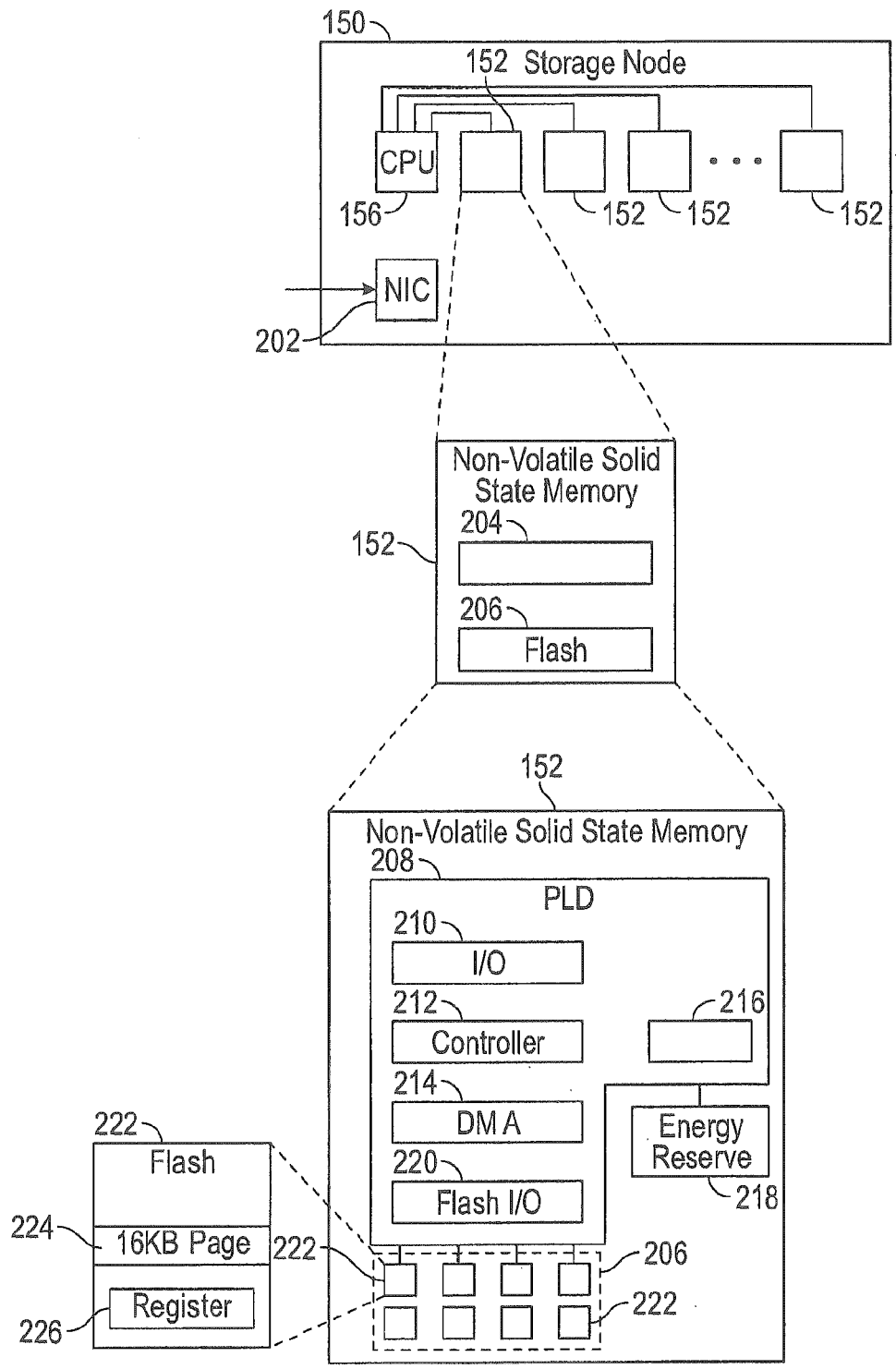
FIG. 3 is a multiple level block diagram, showing contents of a storage node and contents of one of the non-volatile solid state storage units in accordance with some embodiments.

FIG. 3 is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 3, each non-volatile solid state storage 152 has a relatively fast non-volatile solid state memory, such as nonvolatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 3, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 160, in various embodiments as disclosed herein, can be contrasted with storage arrays in general. The storage nodes 150 are part of a collection that creates the storage cluster 160. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 160, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Still referring to FIG. 3, Storage node 150 includes power up control unit 201. Power up control unit 201 interfaces with the chassis management system to provide the power up sequence. Power up control unit 201 may also provide feedback to the chassis management system in some embodiments so that the power sequencing may be able to adapt the power sequencing based on the monitoring provided through the feedback system. Power up control unit 201 powers up a blade or storage node 150 according to information provided by the chassis management system in some embodiments. In some embodiments, a software switch or hardware switch may be integrated into the system to enable the ability to override the power sequence to activate all blades or some other suitable override.

Figure 4:
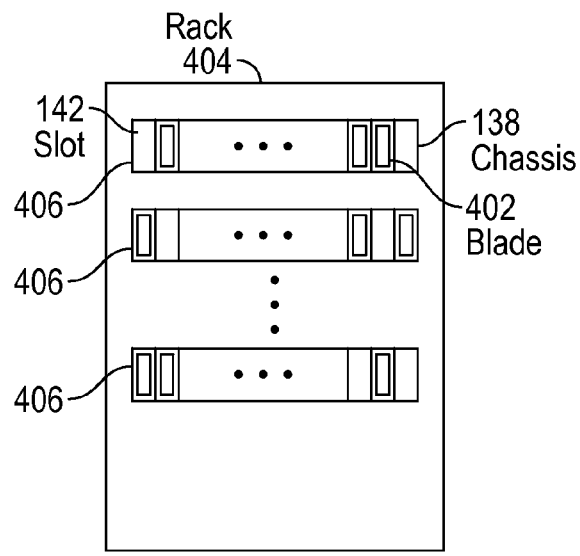
FIG. 4 illustrates a rack with multiple chassis, and blades, with storage nodes and/or compute nodes and storage units, installed in the chassis in accordance with some embodiments.

FIG. 4 is a front view of a rack 404 with multiple chassis 138, and blades 402, with storage nodes and/or compute nodes 150 and storage units 152, installed in the chassis 138. A power sequencing system, as described below with reference to FIGS. 5-8, powers up the blades 402 in a sequence determined by the chassis 138 (i.e., by circuitry included in the chassis 138). The circuitry in the chassis 138 cooperates with the blades 402. In the embodiment shown, each blade 402 has a storage node 150, and each storage node has zero or more storage units 152, such as described above with reference to FIGS. 1-3. By powering up the blades 402 in a sequence, the system avoids a power surge that might occur if all of the blades were powered up simultaneously. Various sequences are possible and the examples provided are not meant to be limiting. A further embodiment powers up multiple chassis 138 in a further sequence. Each chassis 138 occupies a shelf 406 of the rack 404. Various embodiments of the system take into account whether or not a slot 142 of the chassis 138 is occupied by a blade, and (in embodiments with multiple chassis 138) whether or not a shelf 406 of the rack 404 is occupied by a chassis 138, in determining a sequence of power up. It is not required that all slots 142, or all shelves 406, be occupied. As noted above, the power sequence may be adaptive in that the power sequence can be adjusted based on monitoring of the power up of the blades and differences detected during the power up from expected power up parameters. For example, electrical characteristics of the power up may be monitored through the chassis management system and these monitored characteristics may differ from expected electrical characteristics. A subsequent power up sequence may be adjusted to account for this detected difference. This feedback can continue so that the system constantly monitors itself for adjustments.

Figure 5:
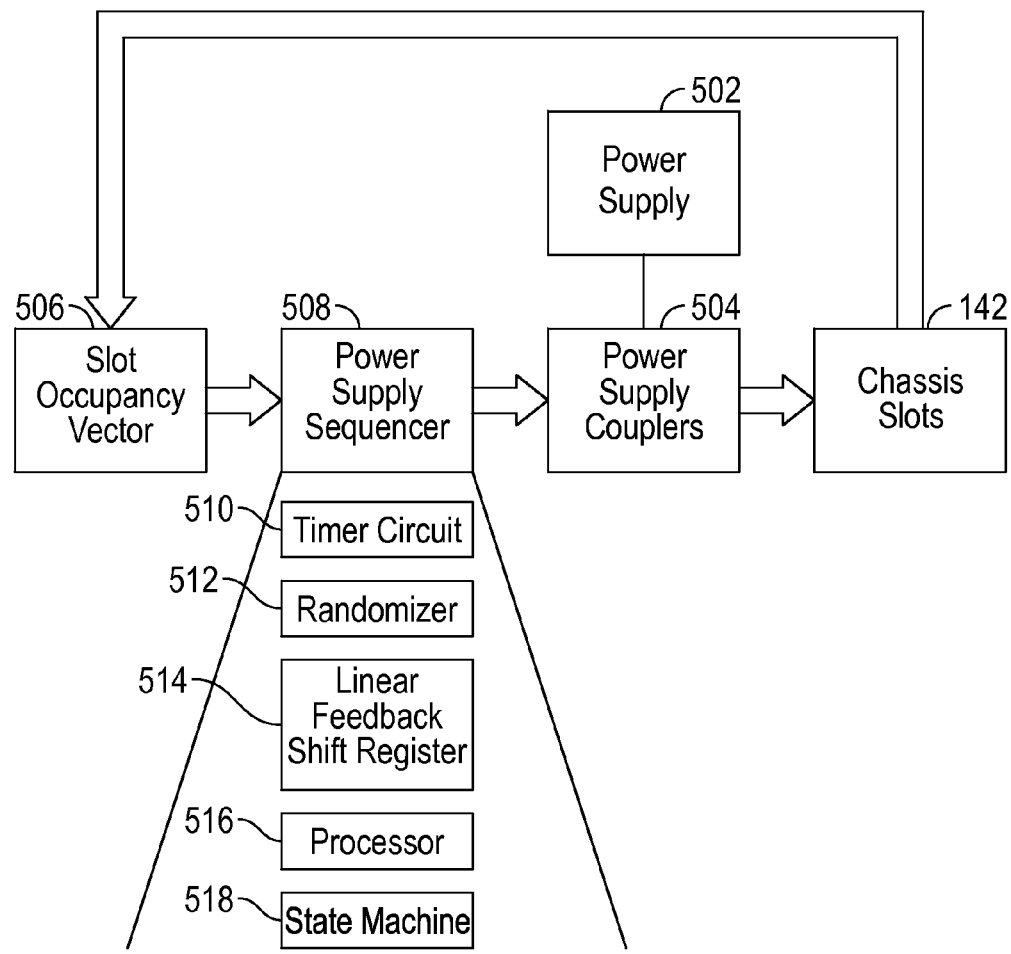
FIG. 5 is a block diagram of a power sequencing system for use with a chassis and blades as shown in FIG. 4, in accordance with some embodiments.

FIG. 5 is a block diagram of a power sequencing system for use with a chassis 138 and blades 402 as shown in FIG. 4, in some embodiments. In this embodiment, the slots 142 of the chassis 138 (i.e., chassis slots 142) communicate a slot occupancy vector 506 to a power supply sequencer 508. The slot occupancy vector 506 indicates which slots 142 of a chassis 138 are occupied. For example, the slot occupancy vector 506 could be a binary code, with a zero bit value indicating a slot is occupied by a blade 402, and a one bit value indicating that a slot is unoccupied. In other embodiments, the slot occupancy vector could include a series of numbers, resistance values, voltage values, etc., each identifying a blade or lack of a blade in a slot 142. Based on the slot occupancy vector, the power supply sequencer 508 determines a sequence for powering up the blades 402. A power supply 502 is connected to power supply couplers 504, which are connected to the chassis slots 142. The power supply sequencer 508 engages the power supply couplers 504 in the determined sequence. In some embodiments, an enable signal to voltage regulators of the storage node may be utilized to avoid the need for any power supply couplers. The power supply couplers 504 then provide power, from the power supply 502, to the chassis slots 142. The blades 402 in the slots 142 are powered up according to the determined sequence.

Various embodiments of the power supply sequencer 508 are possible in FIG. 5. The power supply sequencer 508 could include a timer circuit 510 (see FIG. 7). The timer circuit 510 develops a time interval for each occupied slot 142. Power is applied at the end of the time interval, for each occupied slot 142 in this embodiment. It should be appreciated that the embodiments cover a system that is aware of the location and the number of slots 142 occupied, as well as a system that is not aware of the location and the number of slots 142 occupied. By developing and applying differing time intervals for differing slots 142, the power supply sequencer 508 determines a sequence for application of power to the blades 402, and applies power in accordance with the sequence. The power supply sequencer 508 could include a randomizer 512 in some embodiments. The randomizer 512 receives the slot occupancy vector 506, and determines a random sequence to apply power to the blades 402. It should be appreciated that the random sequence may be based on the number of blades and/or locations in one or more chassis in some embodiments. In some embodiments, the random sequence changes with every power up, and in other embodiments, the random sequence changes with each rearrangement of blades 402 (including removal or installation of a blade 402). The power supply sequencer 508 could include a linear feedback shift register 514. By applying the slot occupancy vector 506 as an input to the linear feedback shift register 514, the power supply sequencer 508 produces a sequence that differs with each arrangement of blades 402.

The power supply sequencer 508 could include a processor 516, executing software. Various algorithms could be programmed into the software. For example, the power supply sequencer 508 could apply power in a "ping-pong" sequence, first to a blade 402 on one side of the center of the chassis 138, next to a blade 402 on the other side of the center of the chassis 138, and so on, back and forth. In some embodiments, blades 402 could be powered up in sequence from left to right, right to left, from sides towards the center of the chassis 138, from the center towards the sides, etc. A polynomial could be developed by the processor 516, based on the slot occupancy vector 506. The sequence could then be based on a result of a polynomial calculation. With knowledge of the slot occupancy vector 506, the power supply sequencer 508 could power up only those slots 142 that are occupied, which is both more time efficient and more energy-efficient than powering up all of the slots 142. It should be appreciated that in some embodiments, the same number of blades in any of the slots would result in the same time to power up the system. In some embodiments, where the slot occupancy vector 506 includes a blade identifier specific to each blade 402, the processor 516 could devise a sequence based on which blade or blades 402 are preferred for earlier power up or later power up, etc. A blade identifier may also be referred to as blade attributes and in addition to including a numeric value identifying the blade, the blade attributes may be accessible through the blade identifier. Blade attributes may include presence or non-presence of a blade in a slot, type of blade, which can include electrical characteristics, such as load, capacitance, etc., physical characteristics of the blade, and an identifier for the blade. In addition, the locality and position of a slot relative to the location of the power supply may be known to the chassis management system or power up control unit in some embodiments. The above principles of operation could be applied to the various embodiments described for power supply sequencers 508, and further embodiments readily devised according to the teachings herein. For example, the slot occupancy vector that could be used as an input on a general purpose input/output (GPIO) pin into the power sequence controller. The power supply sequencer 508 could include a state machine 518, which could be implemented with flip-flops or other hardwired circuitry, or in software executing on a processor 516, etc. A state machine 518, with the slot occupancy vector 506 as an input, could produce various sequences for powering up the blades 402. In a variation of the above circuitry, the shelves 406 of the rack 404 communicate a shelf occupancy vector to the power supply sequencer 508. As noted above, the shelf occupancy vector indicates with shelves 406 are occupied by chassis 138. A further sequence is determined by the power supply sequencer 508, which then directs the power supply couplers 504 to power up the chassis 138 in the shelves 406 according to the further sequence.

Figure 6:
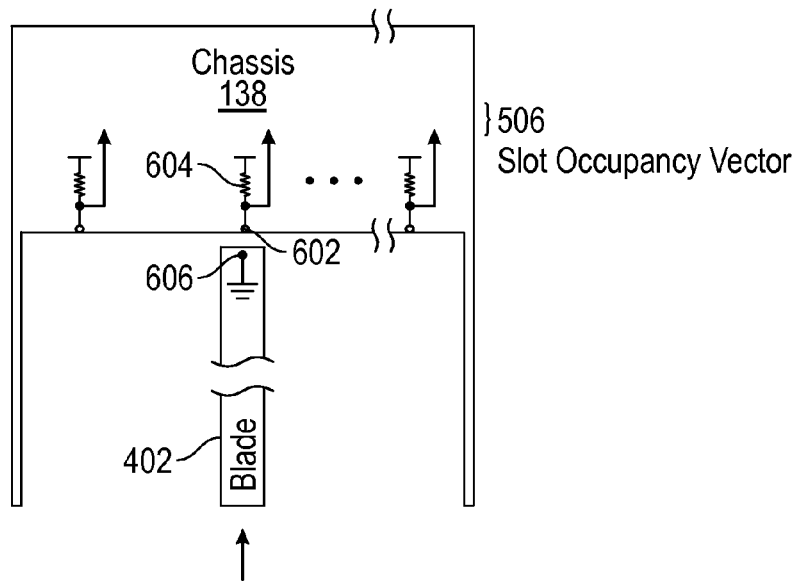
FIG. 6 is a schematic depicting chassis and blade circuitry and physical component relationships, in a chassis that produces a slot occupancy vector for use in the power sequencing system of FIG. 5 in accordance with some embodiments.

FIG. 6 is a schematic depicting chassis 138 and blade 402 circuitry and physical component relationships, in a chassis 138 that produces a slot occupancy vector 506 for use in the power sequencing system of FIG. 5. In this embodiment, the chassis 138 includes one contact 602 for each slot 142. This contact 602 is coupled to a resistor 604, which is coupled to a power supply voltage. The contacts 602 will thus normally have a logical one value, when the slots 142 are unoccupied by blades 402. Each blade 402 has a contact 606 that couples to ground. When a blade 402 is inserted into a slot 142 (per the action shown as an upward pointing arrow, immediately below the blade 402), the contact 606 of the blade 402 grounds the contact 602 of the chassis 138. This contact 602 then has a logical zero value, indicating a slot 142 occupied by a blade 402. Other circuits for indicating occupancy of a slot 142 by a blade 402 are readily devised, with various polarities, numbers of bits, and application of passive or active components. In some embodiments a blade type may be identified with one or more bits or pins. One principle that is available to the embodiment shown, and variations thereof, is that the slot occupancy vector 506 is produced without application of power to the remainder of the blade 402. Thus, the slot occupancy vector 506 can be determined by the chassis 138, prior to powering up the blades 402. As an output, the slot occupancy vector 506 has a combination of logical ones and zeros according to which of the slots 142 are occupied by blades 402. In variations, a blade 402 could occupy one, two or several slots 142. In some versions, the slot occupancy vector 506 could indicate such a narrower or wider blade, and the sequence developed by the power supply sequencer 508 could take this into account. Further contacts of the chassis 138 and the blade 402, for bus, power, network and other connections, are not shown (but, see FIG. 7 for examples) and are readily devised.

Figure 7:
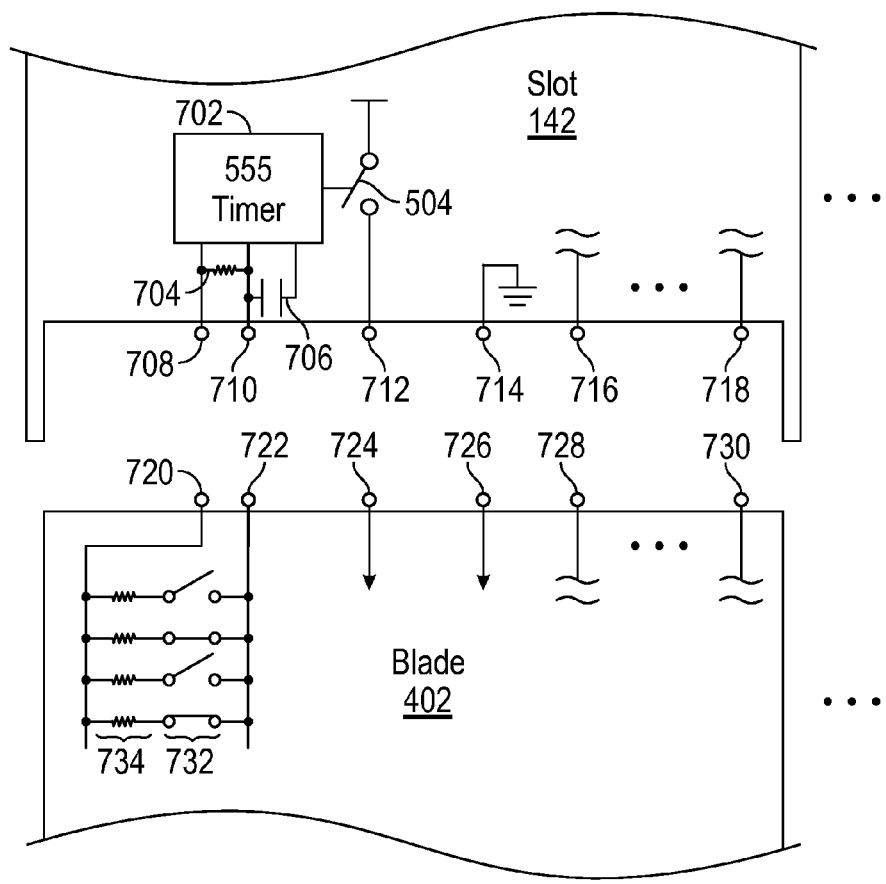
FIG. 7 is a schematic depicting chassis and blade circuitry and physical component relationships of a slot and a blade in a further embodiment of slot occupancy vector of FIG. 6 and the power sequencing system of FIG. 5 in accordance with some embodiments.

FIG. 7 is a schematic depicting chassis 138 and blade 402 circuitry and physical component relationships of a slot 142 and a blade 402 in a further embodiment of the slot occupancy vector 506 of FIG. 6 and the power sequencing system of FIG. 5. In this version, each slot 142 has a timer 702 (e.g., a 555 timer) with a resistor 704 and a capacitor 706. Two terminals 708, 710 of the timer circuit are available in the slot 142, for coupling to a blade 402. The timer outputs a control signal to one of the power supply couplers 504, which could be a relay, a transistor, or other type of switch that is controllable by a signal. In some embodiments a control signal could be transmitted to a power supply, turning the power supply on or off. Each blade 402 has two terminals 720, 722 with selectable resistance between the terminals 720, 722. This could be implemented as a group of resistors 734 and switches 732 (e.g., dual in-line package or dip switches). Resistor values may encode a blade identifier. When the two terminals 720, 722 of the blade 402 couple to the two terminals 708, 710 of the timer circuit, the selected resistance representing the blade identifier is expressed to the timer circuit. The timer circuit then produces a time delay of a particular value, based on the blade identifier and type of blade. At the end of the time delay, the timer circuit directs the power supply coupler 504 to couple power to the blade 402, through a power terminal 712 of the slot 142 and a power terminal 724 of the blade 402. Further couplings of the slot 142 and the blade 402 are shown as a ground terminal 714 of the slot 142, a ground terminal 726 of the blade 402, various signal terminals 716, 718 of the slot 142 and various signal terminals 728, 730 of the blade 402. Since the resistance value for each blade 402 is individually settable, a user can select blade identifiers that match or differ and can control the sequence by which the blades 402 are powered up. For example, setting blade identifiers in matched pairs would result in powering up blades 402 in pairs. Setting blade identifiers that are all different across the group of blades 402 (i.e., unique to each blade 402) would result in powering up blades 402 one at a time or sequentially, with no two blades 402 being powered up at the same time. As with the embodiment depicted in FIG. 6, the embodiment depicted in FIG. 7 produces a slot occupancy vector 506 without application of power to the remainder of the blade 402. In variations, one or more resistors could be hardwired rather than switchable, one or more resistors could be coupled to a ground terminal of the blade 402, a resistor could have a zero resistance value (i.e., be a short-circuit), or the group of resistors 734 and switches 732 could be presented via a single terminal 722 to couple to the timer 702. Resistors 734, switches 732, and couplings to a ground line could implement a binary code as a blade identifier.

With reference to FIGS. 6 and 7, the slot occupancy vector 506 can indicate or identify presence or absence of a blade (as in FIG. 6 and FIG. 7) or identify individual blades 402 distinct from one another (as in FIG. 7). With reference to FIGS. 4 and 5, the slot occupancy vector 506 can be used in various ways, in various circuits, for production of a sequence applied to powering up blades 402 in a chassis 138 and/or multiple chassis 138 on shelves 406 in a rack 404.

Various embodiments of the power sequencing system can alter the total power up time, the timing, and the order of the sequence based on what slots 142 are occupied in the chassis 138. For example, a second slot 142 could start at time equals zero if a first slot 142 is not occupied, but at time equals one if the first slot 142 is occupied. Blades 402 could be started based on proximity to a power supply 502 in the chassis 138. For example, blades that are closest to a power supply 502 or power supplies 502 could be started at the same time (one or more from each end), using the bulk capacitance of the power supply 502 to help minimize current spikes. Blades 402 could be interleaved as to power up sequence, as could multiple chassis 138 in a rack 404. The embodiments cover static embodiments, e.g., a resistor change based on the occupancy of the slot and dynamic embodiments where the chassis management system and the power up control unit cooperate and have knowledge of the system state to achieve an optimal system load to minimize any current spikes. In one embodiment of the static mechanism, the decision for applying the power sequencing to achieve an optimal system load occurs at start-up of the system. In the dynamic embodiment, there is a feedback loop that checks the current spike against what the system expects and adjusts the start-up power sequencing mechanism accordingly to converge to an optimal system load. The adjustment could increase or decrease the time based on the optimization goal. For example, if the spike is lower than expected and the system can provide a new start-up current profile, the start-up sequence can be made faster. Conversely, if the spike is higher or greater than expected, the start-up sequence can be made slower. In some embodiments, the adjustment functions to overlay additive current graphs for each blade. In some embodiments of the dynamic mechanism, there are two adjustments: 1) verifying the graph is correct in amplitude and time and 2) phase shifting the graphs, e.g., a left or right shift.

Figure 8A:
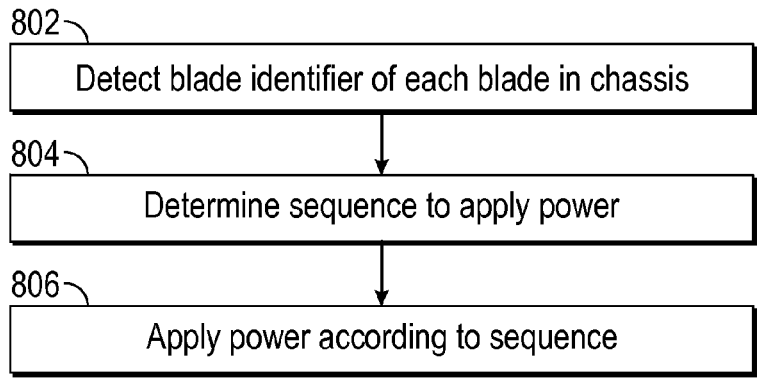
FIG. 8A is a flow diagram of a method for power sequencing of blades in a chassis, which can be applied to the storage cluster, storage nodes, compute nodes, and storage units in accordance with some embodiments.

FIG. 8A is a flow diagram of a method for power sequencing of blades in a chassis, which can be applied to embodiments of a storage cluster, storage nodes, compute nodes, storage units, and hybrid system as described herein. The method can be practiced by a chassis, more specifically by circuitry of the chassis, such as the chassis management system, in cooperation with one or more blades. In an action 802, blade attributes of each blade in the chassis is detected. For example, the chassis could detect presence or absence of one or more blades through use of a slot occupancy vector produced by the chassis in cooperation with any blades that are present in slots. The slot occupancy vector includes blade identifiers or blade attributes that identify whether a blade is present or absent, the type of blade, and in some embodiments identifies individual blades uniquely. The blade attributes may include physical and electrical characteristics of the blade. Thus, in action 802 the chassis configuration and blade attributes are determined, i.e., a system state is captured in one embodiment. The system state is captured prior to the blades being powered up in some embodiments. That is, power may be applied to the chassis so that the system state is captured, however, applying the power sequence to each of the blades occurs after capturing the system state and the blade attributes so that a power sequence can be generated or adjusted and then applied. The chassis configuration may include presence of a blade in a slot of the chassis, the number of slots in the chassis, location of power supplies relative to the slots of the chassis, and other physical and electrical characteristics of the chassis. A sequence to apply power is determined, in an action 804. Determination of this sequence could employ one of the embodiments described above with reference to FIGS. 4-7. The sequence for applying power to the blades in the chassis may be generated based on the chassis configuration and the blade attributes in one embodiment. In another embodiment the power sequence may adjusted to achieve an optimal system load from monitoring of previous power ups of the blades through a feedback mechanism as noted above. For example, an in-rush current may be monitored and may be non-optimal. Based on this monitoring the system may adjust the power sequence for future power cycles to provide for a more optimal in-rush current. Power is applied according to the sequence, in an action 806. A power supply sequencer, as described above, could both develop the sequence and apply the sequence, through use of power supply couplers connected to chassis slots in one embodiment. As noted above, the application of the power sequence may be monitored in order to provide feedback to adjust future power cycles. In addition, a blade may be removed and/or added thereby changing the chassis configuration. A change in the chassis configuration may trigger the power sequence to be adjusted to provide the optimal system load.

Figure 8B:
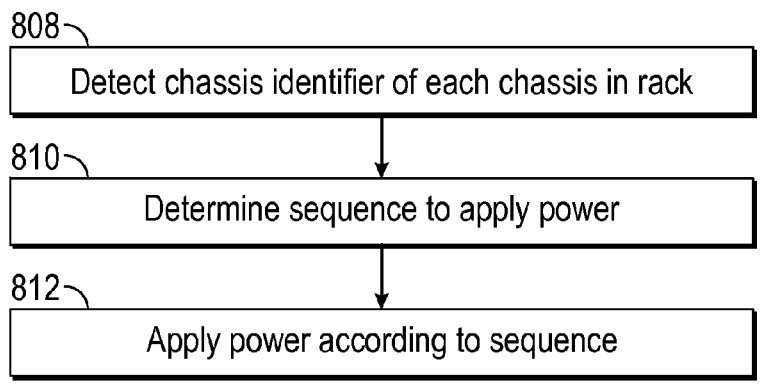
FIG. 8B is a flow diagram of a method for power sequencing of chassis in a rack, which can be applied to the storage cluster, storage nodes, compute nodes, and storage units in accordance with some embodiments.

FIG. 8B is a flow diagram of a method for power sequencing of chassis in a rack, which can be applied to embodiments of a storage cluster, storage nodes, storage units and hybrid system as described herein. The method can be practiced by a rack, more specifically by circuitry of the rack in cooperation with one or more chassis. In an action 808, a chassis identifier or chassis attributes of each chassis in the rack is detected. For example, the rack could detect presence or absence of one or more chassis, through use of a shelf occupancy vector produced by the rack in cooperation with any chassis that are present in shelves. The shelf occupancy vector includes chassis identifiers that identify whether a chassis is present or absent, and in some embodiments identifies individual chassis uniquely. In some embodiments it can be determined how to power up blades within a chassis and across chassis. For example a policy that is user defined can be set to specify a maximum number of blades to start at one time or contemporaneously. A sequence to apply power is determined, in an action 810. Determination of the sequence could employ one of the embodiments described above with reference to FIGS. 4-7. The sequence is for applying power to multiple chassis in a rack. Power is applied according to the sequence, in an action 812. A power supply sequencer, as described above could both develop the sequence and apply the sequence, through use of power supply couplers connected to shelves in the rack in one embodiment. It should be appreciated that the embodiments may be extended to include mechanisms not only for chassis power sequencing and power/current budgets, but also for power budgets applied to the rack. This rack budget could be determined by the rack power strip(s) or a power distribution unit. The embodiments for power budgets applied to the rack include some information exchange between the chassis so that the chassis are aware they are collocated. In some embodiments, the management port could provide this information. In other embodiments a Bluetooth, near filed communication, or other short distance communication mechanism may be utilized to detect or determine the proximity of the chassis. Multiple sensors could be used to triangulate proximate servers to determine if the servers are in the same rack and how far apart they are. In some embodiments a chassis-to-chassis communication via a built-in switch may be utilized to gather this information. In some embodiments, the chassis can share this information and utilize current monitoring information for a rack power strip as feedback to correlate between the racks and start-up. One of the chassis may be assigned to be the master and provide updates to the power sequencing plan for a next start-up event. In some embodiments, there can be different policies based on full rack power up or single chassis power up when adding and powering up a chassis.

Figure 8C:
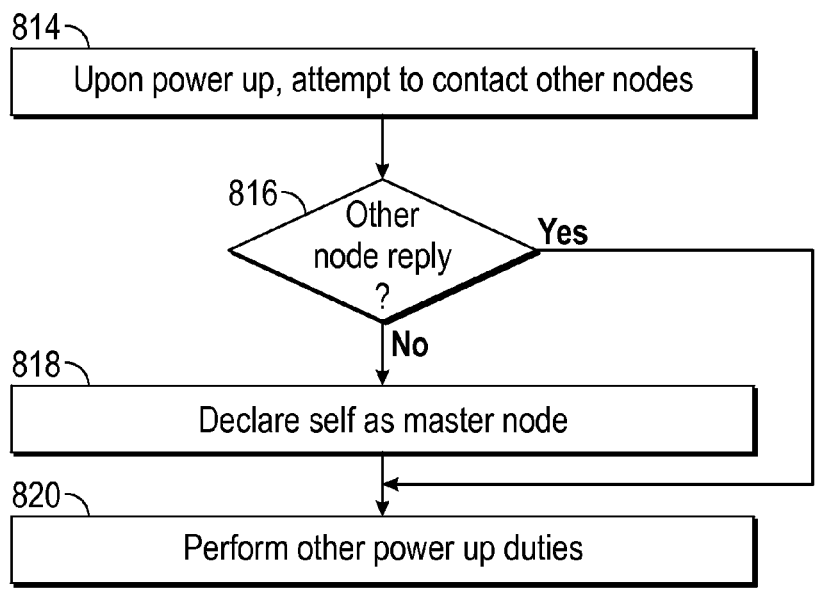
FIG. 8C is a flow diagram of a method for power sequencing to determine a master node of a storage cluster, which can be applied to the storage cluster, storage nodes and storage units in accordance with some embodiments.

FIG. 8C is a flow diagram of a method for power sequencing to determine a master node of a storage cluster, which can be applied to embodiments of a storage cluster, storage nodes, storage units, and hybrid system as described herein. The method of FIG. 8C can be practiced by storage nodes, more specifically by processors of storage nodes. In an action 814, upon power up, a storage node attempts to contact other storage nodes. In a decision action 816, it is determined whether another node replies. If one or more other nodes reply, the answer to the question posed in the decision action 816 is yes, and flow branches to the action 820, to perform other power up duties. If no other node replies, the answer to the question posed in the decision action 816 is no, and flow proceeds to the action 818. In the action 818, the storage node declares itself as a master node. Flow proceeds to the action 820, to perform other power up duties. According to the above actions, whichever node powers up first in a power up sequence declares itself the master node.

Figure 9:
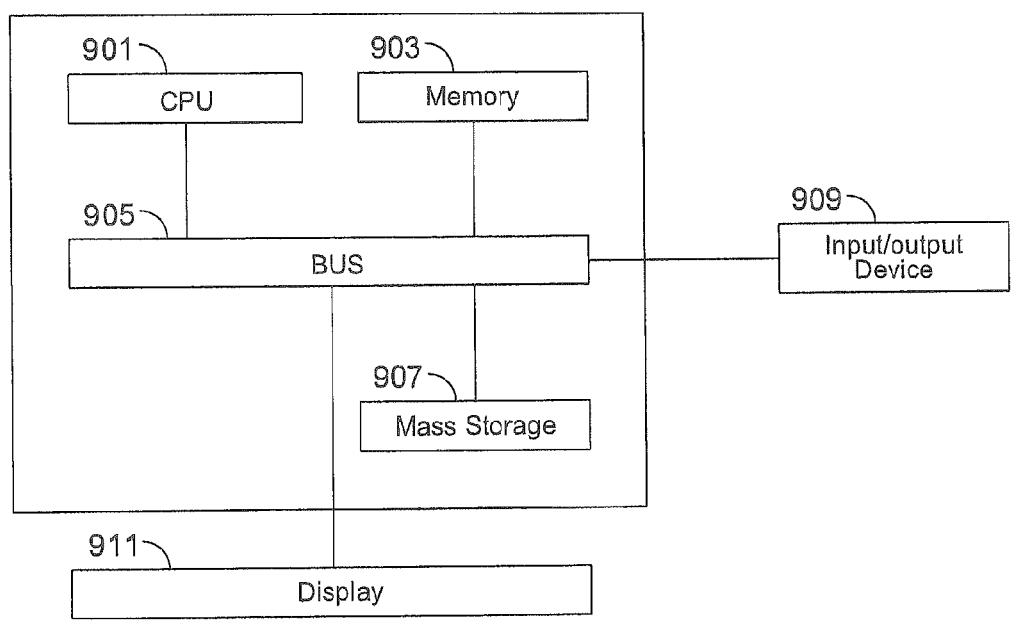
FIG. 9 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 9 is an illustration showing an exemplary computing device which may implement the embodiments described herein. The computing device of FIG. 9 may be used to perform embodiments of the functionality for power supply sequencing and/or storage node, storage unit or storage cluster functions in accordance with some embodiments. The computing device includes a central processing unit (CPU) 901, which is coupled through a bus 905 to a memory 903, and mass storage device 907. Mass storage device 907 represents a persistent data storage device such as a floppy disc drive or a fixed disc drive, which may be local or remote in some embodiments. The mass storage device 907 could implement a backup storage, in some embodiments. Memory 903 may include read only memory, random access memory, etc. In some embodiments the chassis configuration or blade attributes may be stored in memory 903 or some other suitable storage medium accessible by CPU 901. Applications resident on the computing device may be stored on or accessed via a computer readable medium such as memory 903 or mass storage device 907 in some embodiments. Applications may also be in the form of modulated electronic signals modulated accessed via a network modem or other network interface of the computing device. It should be appreciated that CPU 901 may be embodied in a general-purpose processor, a special purpose processor, or a specially programmed logic device in some embodiments.

Display 911 is in communication with CPU 901, memory 903, and mass storage device 907, through bus 905. Display 911 is configured to display any visualization tools or reports associated with the system described herein. Input/output device 909 is coupled to bus 905 in order to communicate information in command selections to CPU 901. It should be appreciated that data to and from external devices may be communicated through the input/output device 909. CPU 901 can be defined to execute the functionality described herein to enable the application and monitoring of the power sequencing. The code embodying this functionality may be stored within memory 903 or mass storage device 907 for execution by a processor such as CPU 901 in some embodiments. The operating system on the computing device may be MS DOS™, MS-WINDOWS™, OS/2™, iOS™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for power sequencing in a chassis configurable to receive a plurality of blades, comprising:
   determining a chassis configuration prior to the plurality of blades disposed within a respective plurality of slots of the chassis being powered up;
   generating a power sequence based on the determining;
   applying the power sequence to the blades;
   monitoring the applying and the chassis configuration, the monitoring including detecting a difference between an actual system load and an expected system load; and
   adjusting the power sequence for a next power cycle to converge to the expected system load.

2. The method of claim 1, wherein the determining includes determining a time interval based on blade attributes.

3. The method of claim 1, wherein the determining includes identifying blade attributes, the blade attributes associated with physical characteristics and electrical characteristics of a corresponding blade.

4. The method of claim 1, wherein the monitoring includes detecting a change to the chassis configuration; and
adjusting the power sequence for a next power cycle to maintain the expected system load.

5. The method of claim 1, further comprising:
detecting a chassis identifier of each of a plurality of chassis, including the chassis, in a rack;
determining a further sequence with which to apply power, one or more chassis at a time, to the plurality of chassis, based on the chassis identifier of each of the plurality of chassis; and
applying power to the plurality of chassis in accordance with the further sequence and the chassis identifier of each of the plurality of chassis.

6. The method of claim 1, wherein generating the power sequence is based on a policy specifying a maximum number of the blades starting contemporaneously.

7. A power sequencing system, comprising:
a chassis having a plurality of slots configurable to accept a respective plurality of blades;
each blade of the plurality of blades having blade attributes that circuitry within the chassis is configured to identify prior to applying power to the plurality of blades; and
the circuitry within the chassis configured to apply a power sequencing method to the plurality of blades, the method comprising:
generating a power sequence based on the identified blade attributes and a chassis configuration;
applying the power sequence to the plurality of blades;
monitoring the applying and the chassis configuration, the monitoring including detecting a difference between an actual system load and an expected system load; and
adjusting the power sequence for a next power cycle to converge to the expected system load.

8. The power sequencing system of claim 7, wherein the circuitry within the chassis includes at least one of: a coupling to ground, or one or more resistors, wherein the coupling to ground or a value of the one or more resistors indicates a slot of the chassis as being occupied by a blade.

9. The power sequencing system of claim 7, further comprising:
a timer configured to produce time intervals based on the blade attributes of each of the plurality of blades, wherein the power sequence is based on the time intervals.

10. The power sequencing system of claim 7, further comprising:
each of the plurality of slots of the chassis having a default resistor value; and
each of the plurality of blades having a further resistor value, detectable by the circuitry within the chassis, wherein the further resistor value is lower than the default resistor value.

11. The power sequencing system of claim 7, further comprising:
each of the plurality of slots of the chassis having a timing circuit with a timer and a capacitor; and
each of the plurality of blades having a resistor, a value of which is associated with the blade attributes, wherein the sequence is based on a time constant of the capacitor and the resistor, for each of the plurality of blades.

12. The power sequencing system of claim 7, further comprising:
a plurality of chassis, including the chassis;
a rack;
each chassis of the plurality of chassis having a chassis identifier; and
circuitry of the rack configured to apply power in a further sequence to successive chassis of the plurality of chassis, with the further sequence determined in accordance with the chassis identifier of each chassis.

13. The power sequencing system of claim 7, further comprising:
each blade of the plurality of blades configurable to determine whether the blade is a first blade to power up in the power sequence and designate the first blade as a master node.

14. A power sequencing chassis, comprising:
a chassis having a plurality of slots, wherein the plurality of slots are configurable to receive a respective plurality of blades;
circuitry of the chassis configurable to execute a power sequence method for powering each blade of the plurality of blades, the method comprising:
determining a chassis configuration prior to the plurality of blades being powered up within the plurality of slots of the chassis;
generating a power sequence based on the determining;
applying the power sequence to the plurality of blades;
monitoring the applying and the chassis configuration; and
for each blade of the plurality of blades determining whether the blade is a first blade to power up in the power sequence and if so designate the first blade as a master node.

15. The power sequencing chassis of claim 14, further comprising:
each of the plurality of blades having a selectable resistance that can be set to a resistance value to represent blade attributes, the blade attributes associated with physical characteristics and electrical characteristics of a corresponding blade.

16. The power sequencing chassis of claim 14, further comprising:
the circuitry of the chassis including a timer and a capacitor that cooperate with a resistor of each blade of the plurality of blades to produce a time interval specific to the blade, wherein the power sequence is based on the time interval produced for each of the plurality of blades.

17. The power sequencing chassis of claim 14, further comprising:
a rack having a timer and a capacitor that cooperate with a resistor of each of a plurality of chassis, including the chassis, to produce a time interval specific to the chassis; and
circuitry of the rack configured to power up successive chassis, of the plurality of chassis, one or more chassis at a time, in a further sequence based on the time interval of each of the plurality of chassis.

18. The power sequencing chassis of claim 14, further comprising:
the circuitry of the chassis configured to generate a vector based on which of the plurality of slots is occupied by one of the plurality of blades, wherein the power sequence is based on the vector and wherein the power sequence changes when a further blade is inserted to the chassis.

19. The power sequencing chassis of claim 14, wherein the circuitry of the chassis generating the power sequence includes a linear feedback shift register and does not include a processor.

20. The power sequencing chassis of claim 14, wherein the method for the circuitry of the chassis further comprises:
   detecting a difference between an actual system load and an expected system load during the monitoring; and
   adjusting the power sequence for a next power cycle to converge to the expected system load.

* * * * *